Feb. 19, 1929.
W. A. BLACKBURN
1,703,025
AUTOMOBILE HEATING DEVICE
Filed Oct. 20, 1927
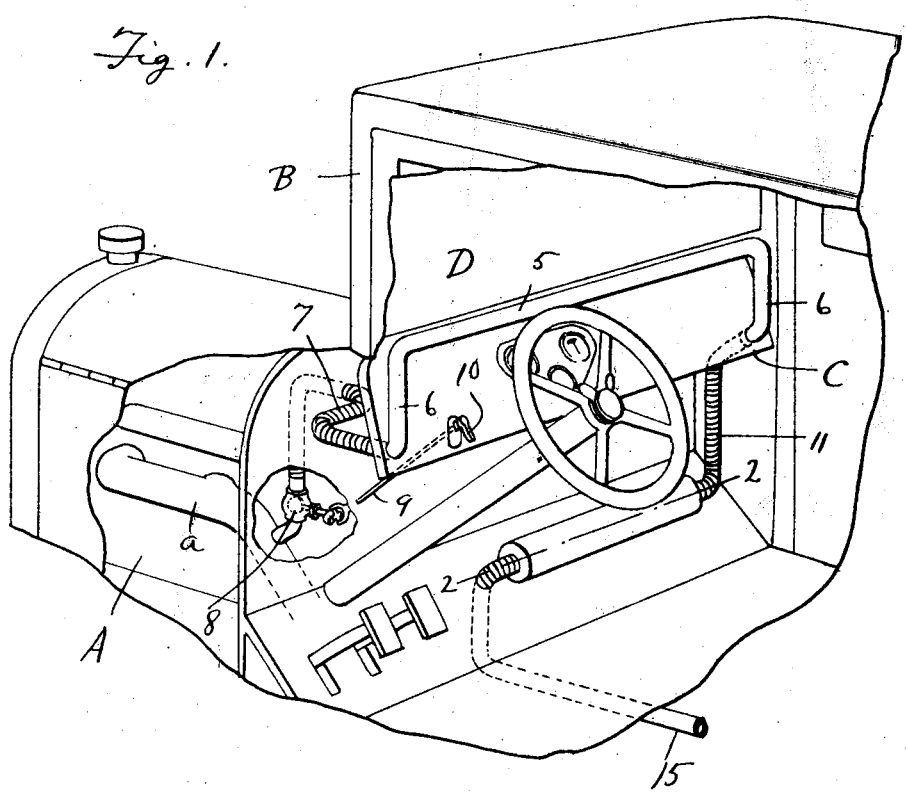
Fig. 1.
Fig. 2.
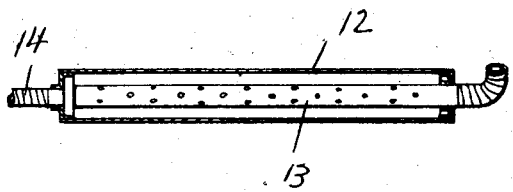
Inventor
W. A. Blackburn
By Clarence A. O'Brien
Attorney Patented Feb. 19, 1929.

1,703,025

UNITED STATES PATENT OFFICE.

WILLIAM A. BLACKBURN, OF PULASKI, VIRGINIA.

AUTOMOBILE HEATING DEVICE.

Application filed October 20, 1927. Serial No. 227,535.

This invention relates to new and useful improvements in heating devices for automobiles, and aims to provide a highly novel, simple and inexpensive means whereby the interior of an automobile body may be properly heated, and especially at the forward end thereof.

Furthermore, by reason of the present invention the automobile windshield is maintained in a warm state to prevent the accumulation of snow or ice upon the outside of the windshield as well as the accumulation of fog or other moisture upon the inner side thereof.

One of the most important objects of this invention is to provide such a heating device that may be installed within practically all characters of automobiles without materially altering the construction thereof.

Generally the invention consists of a hot gas conducting pipe arranged horizontally at the upper edge of an automobile instrument board directly beneath the lower edge of the windshield and having communication with the exhaust manifold so that the exhaust gases will pass therethrough, resulting in the distribution of heat within the interior of the car, and the maintenance of the windshield in a warm condition. Furthermore, the invention includes a horizontally arranged drum having communication with the instrument board attached pipe, which drum is located upon the toe board of the automobile so that the occupant's feet may be maintained in warm condition.

In the drawing wherein like reference characters indicate corresponding parts in all the views:

Figure 1 is a fragmentary perspective of the front end of a conventional automobile equipped with my improved device, and Figure 2 is an enlarged longitudinal section through one portion of the device that is arranged horizontally upon the toe board of the automobile.

Now having particular reference to the drawing, A designates generally the combustion engine of an automobile B which engine is equipped with exhaust gas manifold $a$. In Figure 1 there is furthermore disclosed as a part of the automobile an instrument board C located in front of the driver and directly beneath the windshield D. My invention per se contemplates the provision of a longitudinally extending gas pipe 5 arranged upon the automobile instrument board C directly at the upper edge thereof so that the heat radiating therefrom will not only circulate within the body of the machine in back of the windshield, but will strike against the windshield for maintaining the same warm. Any means may be provided for securing this pipe to the instrument board. The opposite ends of the pipe are provided with downturned portions 6—6 while the lower ends thereof are bent inwardly for engagement through openings in the instrument board. One end 6 has communication with the engine exhaust pipe $a$ through the medium of a flexible pipe 7 within which is located a suitable control valve 8 that may be operated by a suitable rod 9 that extends through the dash board of the machine and thence through the instrument board that is equipped at its outer end with a suitable operating handle 10.

The opposite end portion of the horizontal pipe 5 has communication with a flexible pipe 11 that extends downwardly along one side of the automobile body. This pipe is then extended horizontally upon the automobile toe board and surrounding which horizontal portion is a relatively elongated drum 12, the portion of the pipe within the drum being provided with openings 13 so that the exhaust gases may circulate within the drum for thoroughly heating the same. The inner end of the drum 12 has communication with a flexible pipe 14 that is extended downwardly through an opening in the toe board from whence it extends rearwardly as at 15, said pipe then having communication with the regular automobile exhaust pipe or opening to the atmosphere as desired.

In view of the foregoing description when considered in conjunction with the accompanying drawing it will be apparent that I have provided a highly novel, simple and efficient device for automobiles that is well adapted for all the purposes heretofore designated, and even though I have herein shown and described the invention as consisting of certain detail structural elements, it is nevertheless to be understood that some changes may be made therein without affecting the spirit and scope of the appended claim.

Having thus described the invention, what I claim as new is:—

In an automobile heating device of the character described, a length of piping adapted to be arranged horizontally upon the usual instrument board of the automobile and at the upper portion thereof, said pipe being provided with a depending portion at each end thereof, a section of flexible pipe extending from the usual exhaust pipe of the automobile and communicating with one end of the horizontally disposed pipe, a drum supported upon the usual floor board of the automobile, said drum being provided with a perforated pipe section extending therethrough, and a flexible pipe communicating said perforated pipe section with the pipe on the instrument board.

In testimony whereof I affix my signature.

WILLIAM A. BLACKBURN.